(12) United States Patent
Mori et al.

(10) Patent No.: US 6,237,710 B1
(45) Date of Patent: May 29, 2001

(54) LOCKING ARRANGEMENT FOR MOTORCYCLE

(75) Inventors: Shuuichi Mori; Masaaki Kuwata; Yutaka Kubo; Shinsuke Okada, all of Iwata (JP)

(73) Assignee: Yamaha Hatsudoki Kabushiki Kaisha (JP)

( * ) Notice: Subject to any disclaimer, the term of this patent is extended or adjusted under 35 U.S.C. 154(b) by 0 days.

(21) Appl. No.: 09/425,305

(22) Filed: Oct. 25, 1999

(30) Foreign Application Priority Data

| Oct. 26, 1998 | (JP) | ................................................ | 10-304532 |
| Oct. 27, 1998 | (JP) | ................................................ | 10-305702 |
| Oct. 27, 1998 | (JP) | ................................................ | 10-305734 |

(51) Int. Cl.⁷ .................................................. B62H 5/00
(52) U.S. Cl. ............................ 180/219; 280/272; 280/835; 70/233
(58) Field of Search ........................... 180/219; 280/272, 280/833, 835; 70/233, 252, 261

(56) References Cited

U.S. PATENT DOCUMENTS

| 4,022,486 | 5/1977 | Plaiss . | |
| 4,179,908 | 12/1979 | Schaumburg . | |
| 4,509,349 | 4/1985 | Partridge . | |
| 4,629,201 | * 12/1986 | Tsukiji | ................................ 280/835 |
| 5,020,625 | * 6/1991 | Yamauchi et al. | .................... 180/219 |
| 5,533,783 | * 7/1996 | Harms et al. | ..................... 297/195.13 |
| 5,595,079 | 1/1997 | Myers . | |
| 5,634,358 | 6/1997 | Myers . | |

FOREIGN PATENT DOCUMENTS 10-129555  5/1998  (JP) .

\* cited by examiner

*Primary Examiner*—Kevin Hurley
(74) *Attorney, Agent, or Firm*—Knobbe, Martens Olson & Bear, LLP

(57) ABSTRACT

A motorcycle includes an integrated locking system. The locking system actuates a seat lock from the main switch as well as a handlebar or steering lock. The steering lock is structured such that an overlap of components results in a locking pin passage that extends into a locking pin chamber. The locking pin passage is substantially shielded by a labyrinth defined by overlapping components. The main switch is positioned forward of at least one gauge and a meter cover surrounds at least the gauge and the main switch as well as covers at least a portion of the fuel tank.

12 Claims, 17 Drawing Sheets

LOCKING ARRANGEMENT FOR MOTORCYCLE

BACKGROUND OF THE INVENTION

1. Field of the Invention

The present invention generally relates to locking systems for motorcycles. More particularly, the present invention relates to integrated locking systems for motorcycles that include seat locks and/or steering locks.

2. Related Art

Motorcycles are enjoying a resurgence in popularity in recent years. This resurgence is due, at least in part, to the open air feeling associated with riding a motorcycle. Of course, this feeling is directly a result of a lack of an operator compartment. Along with the enjoyment of the wind whisking by, operators are confronted with a number of problems that are exasperated by the lack of a lockable operator compartment.

For instance, motorcycles often feature a removable seat. These seats often conceal engine maintenance openings as well as storage compartments. To reduce the likelihood of theft and tampering, locks have been introduced that secure the seat to the motorcycle. The locks are often operated with keys and typically include lock cylinders that are positioned adjacent or below the seat. Also, the locks are usually located toward a rear portion of the seat.

In addition, because there is no operator compartment, motorcycles are exceedingly susceptible to being pushed by thieves. To hinder the ability to push the motorcycles, the steering mechanism can feature a lock. The lock limits or completely eliminates steering movement of the front wheel of the motorcycle. Accordingly, the motorcycle is not able to be steered while it is being pushed. This, of course, reduces the theft rate of the motorcycles. However, the steering locks are often positioned in a region of the motorcycle which leaves the locks themselves subject to substantial tampering. For instance, chisels or hacksaws can be used to break or cut the locking mechanism such that the motorcycle can once again be steered even though the operator made an effort to lock the steering mechanism.

SUMMARY OF THE INVENTION

As will be recognized by those of ordinary skill in the art, these two problems often are resolved through the use of two distinct locking mechanisms. Accordingly, the seat lock is positioned and manipulated in the region of the operator seat while the steering column lock is separately manipulated and located proximate the steering column. Having completely separate locking mechanisms unnecessarily complicates the construction of the motorcycle.

Therefore, a streamlined locking system for a motorcycle is desired. The steering lock, can integrate the seat lock with the steering lock and can position the main switch within a single dash pad or meter cover. In some arrangements, the steering lock, the seat lock and the motorcycle's electrical system are tied together to be operated by a single key operated switch or a single remote transmitter. Such a configuration reduces duplicative components and streamlines the controls of the motorcycle. Additionally, such a configuration reduces the clutter of the dash region of the motorcycle.

In one arrangement, the steering lock may be positioned in an internal location such that tampering made substantially more difficult. In such an arrangement, an overlap of moving components is preferably arranged such that a straight cutting or chopping tool, such as a chisel or hacksaw, cannot be easily wedged into a position that will compromise the integrity of the steering lock.

One aspect of the present invention, therefore, involves an integrated locking system for a motorcycle. The system comprises a main switch adapted to be mounted on the motorcycle, a steering lock and a seat lock. The seat lock is remotely positioned relative to the main switch and the seat lock selectively locks a seat of the motorcycle in a closed position. A cable connects the seat lock to the main switch with the main switch selectively unlocking the seat lock by moving the cable. The steering lock is constructed to selectively limit movement of a steering system of the motorcycle and the steering lock also is actuated by the main switch between a locked position and an unlocked position. The main switch is operated by a key and controls various electrical components of the motorcycle.

Another aspect of the present invention involves a motorcycle comprising a frame, a front wheel being dirigibly connected to a forward portion of the frame with a steering assembly, a seat being moveably attached to the frame, and a fuel tank being mounted on the frame and being positioned at least partially between the seat and the steering assembly. A main switch is positioned forward of at least a portion of the fuel tank and a gauge is mounted above the fuel tank. A dash cover extends around the gauge and the main switch. The main switch controls at least a portion of an electrical system of the motorcycle and the main switch controls a front wheel lock and a seat lock. The front wheel lock comprises a strike member that limits steering movement of the front wheel when engaged and the seat lock comprises a latch mechanism that locks the seat to the frame when engaged.

A further aspect of the present invention involves a seat locking mechanism for a motorcycle. The mechanism comprises a main switch positioned forward of a substantial portion of a fuel tank of the motorcycle. The main switch is operated by rotating a key. A seat lock is mounted to a seat of the motorcycle and a wire extends between the main switch and the seat lock. The wire extends away from the main switch in a direction generally parallel to an axis of rotation of the key in the main switch. The main switch moves the wire in a direction generally parallel to the axis.

BRIEF DESCRIPTION OF THE DRAWINGS

These and other features, aspects and advantages of the present invention will now be described with reference to the drawings of a preferred embodiment, which embodiment is intended to illustrate and not to limit the invention, and in which figures.

DETAILED DESCRIPTION OF THE PREFERRED EMBODIMENTS OF THE INVENTION

Figure 1:
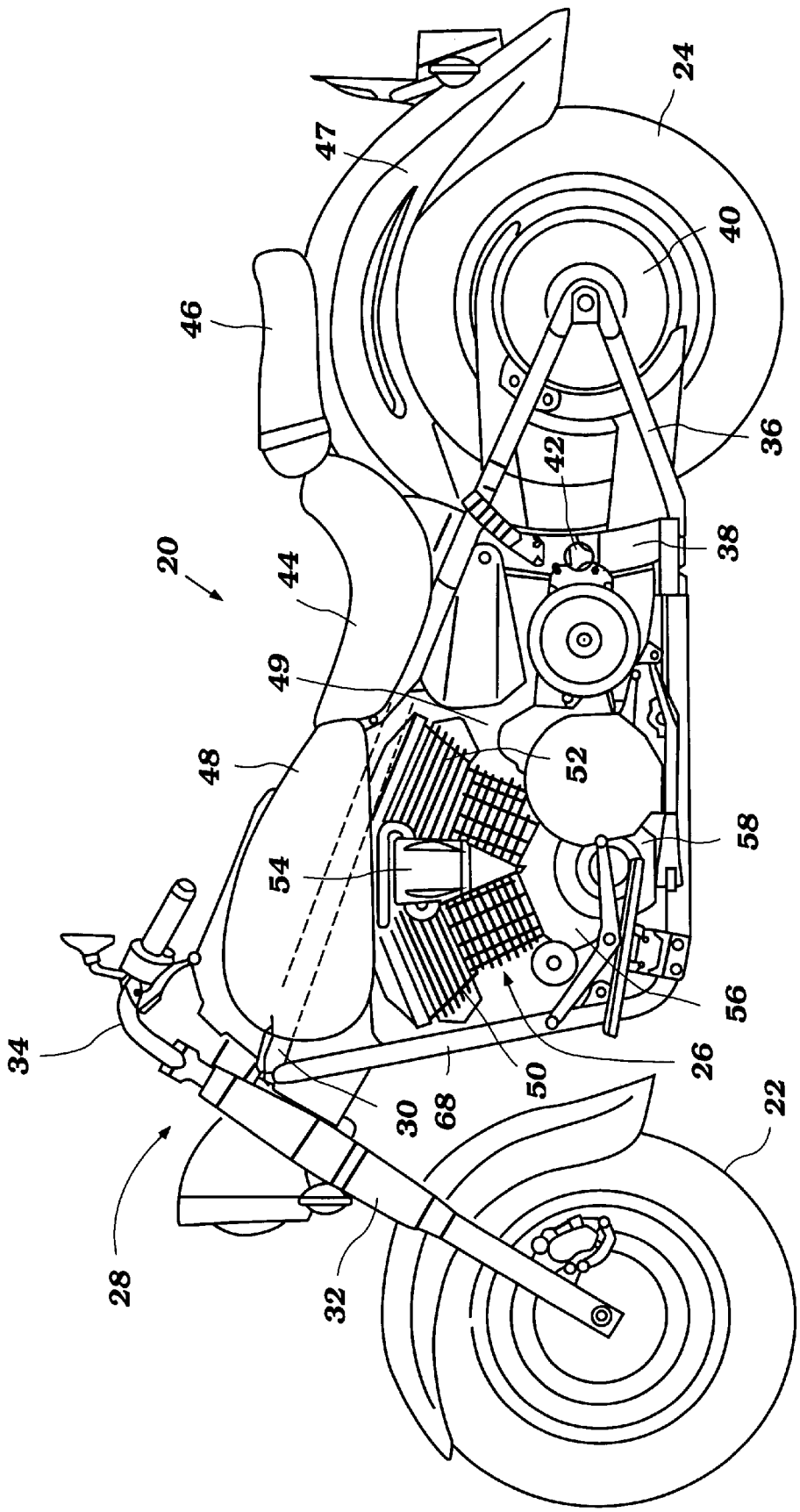
FIG. 1 is a side elevation view of a motorcycle that is configured and arranged in accordance with the present invention.

With initial reference to FIG. 1, a motorcycle as illustrated therein that features a locking system having certain features, aspects and advantages in accordance with the present invention. The motorcycle, indicated generally by the reference numeral 20, features a front wheel 22 and a rear wheel 24. The motorcycle 20 also includes an engine 26 as well as a steering mechanism 28 for the front wheel 22.

The front wheel 22 is connected to a frame 30 via a front fork 32. A pair of handlebars 34 are connected to the front fork 32 and the handle bars 34 carry a plurality of controls as will be recognized by those of ordinary skill in the art. The handle bars 34 and the front fork 32 are rotatably connected to the frame 30 such that the handlebars 34 and the front fork 32 can be pivoted relative to the frame 30 to steer the front wheel 22.

The rear wheel 24 is also connected to the frame 30 through the use of a rear arm 36. The rear arm 36 is attached to the frame 30 through the use of a rear arm bracket 38. The rear arm bracket 38 preferably allows relative movement between the rear wheel 24 and the frame 30. Particularly, in the illustrated embodiment, the rear arm bracket 38 is pivotally attached to the frame such that it can pivot about a pivot axis defined by a shaft 42. In this manner, the rear wheel 24 is allowed to articulate relative to the frame 30 to absorb some of the shocks encountered during operation. In addition, the rear wheel 24 is driven by the engine 26 via a coupling which includes a rear wheel disk 40. The rear wheel 24 can be driven by a shaft drive the illustrated motorcycle 20 features a chain drive arrangement in which a chain extends between a driven pulley positioned proximate the engine 26 and a drive pulley or the rear wheel disk 40.

A seat 44 is mounted to the frame 30 of the illustrated motorcycle 20 such that a rider can sit on the seat 44 during operation of the motorcycle 20. Additionally, a pillion seat 46 is positioned above the rear wheel on a fender 47 to accommodate a second rider in tandem seating fashion. As will be discussed below, the seat 44 is preferably removably attached to the frame 30 to allow access to an engine compartment 49 in which the engine 26 is mounted to the frame 30. Forward of the seat 44, a fuel tank 48 is also mounted to the frame 30 in a manner that will be described below. Fuel supplied from the fuel tank 48 to the engine 26 for combustion in any suitable manner.

Preferably, the present invention is used on the motorcycle 20 having an engine 26 of the V-type, which is arranged with an output shaft extending in a direction generally transverse to a longitudinal axis extending through the motorcycle 20. The engine 26 preferably contains a front bank of cylinders 50 as well as a rear bank of cylinders 52. In the illustrated embodiment, the front bank of cylinders 50 preferably contains a first and second cylinder while the rear bank of cylinders 52 contains a third and fourth cylinder. The front and rear banks of cylinders 50, 52 are preferably inclined with respect to one another and with respect to a generally vertical plane which extends through the engine 26 at or near the crankshaft or output shaft. Moreover, in the illustrated embodiment, the front bank of cylinders 50 preferably tilts forwardly towards a front of the motorcycle 20 while the rear bank of cylinders 52 tilts rearwardly towards a rear of the motorcycle 20. A carburetor 54 is preferably positioned between the cylinder banks 50, 52 and receives fuel from the fuel tank 48 as well as air through a suitable induction system for mixing and providing a air fuel charge to each of the cylinders within the front bank of cylinders 50 and the rear bank of cylinders 52.

The front and rear banks of cylinders 50, 52 each extend from a block 56. A lower section of the block 56 defines a portion of a crankcase 58 in which a crankshaft (not illustrated) is journaled for rotation. Each cylinder contains a piston (not illustrated) which is connected to the crankshaft via a connecting rod. Movement of the pistons effectuates rotation of the crankshaft which in turn powers the rear wheel 24 of the motorcycle 20 through a transmission. Because the engine in the illustrated embodiment can be of any suitable configuration and because it is not directly related to the present invention, further description of the engine is deemed unnecessary.

Figure 2:
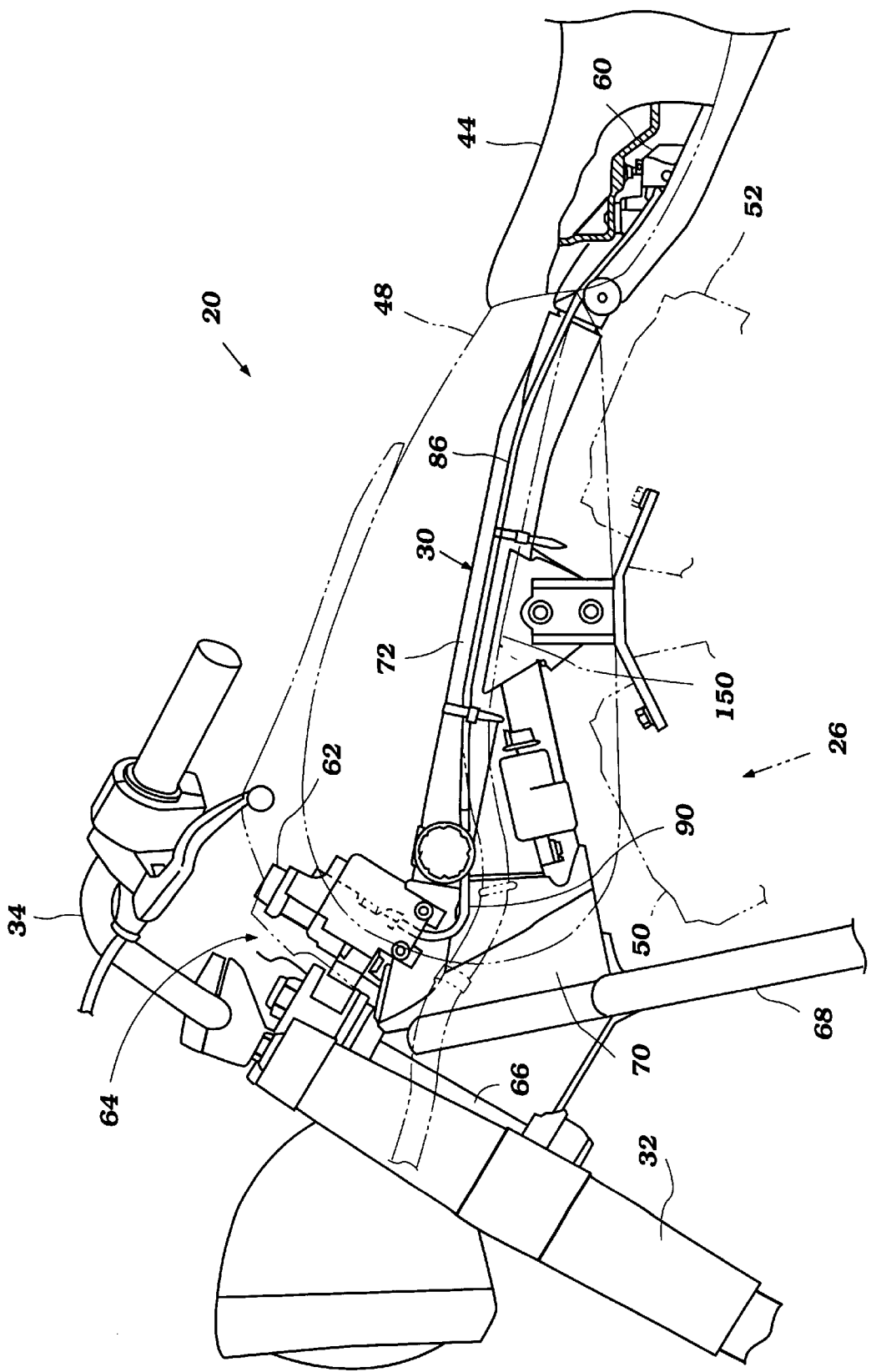
FIG. 2 is an enlarged partial side elevation view of the motorcycle of FIG. 1 illustrating a seat lock mechanism.

With reference to FIG. 2, and as described above, the seat 44 is preferably removably attached to the frame 30 to reveal a maintenance opening to the engine compartment 49 in which the engine 26 is mounted. Of course the seat 44 can also cover one or more other storage compartments as will be readily recognized by those of ordinary skill in the art. As illustrated in FIG. 2, a seat lock 60 is preferably positioned below a forward portion of the seat 44. The seat lock 60 selectively locks the seat 44 to the frame 30 in the illustrated motorcycle 20. The seat lock 60 will be described in greater detail below.

Preferably, the seat lock 60 is operated from a main switch 62 that is positioned forward of the fuel tank 48. As will be described below, the main switch 62 also operates a handle lock, which is indicated generally by the reference numeral 64. As will be recognized by those of ordinary skill in the art, the handle lock 64 fixes a location of the front forks 32 relative to the frame 30 such that the vehicle or motorcycle 20 cannot be steered when the handle lock 64 is engaged. The handle lock 64 will be discussed in greater detail below.

With continued reference to FIG. 2, the main frame 30 preferably includes a head pipe 66 which dirigibly supports the front wheel 22 and its supporting fork assembly 32. The head pipe 66 is preferably disposed at the forwardmost portion of the frame assembly 30 and defines a steering axis that is inclined rearwardly from a vertical plane at an acute angle. A pair of down tubes, each indicated by the reference numeral 68, are connected at their forward ends to the head pipe 66 by welding, for instance. In the illustrated embodiment, the down tubes 68 are tubular. As will be recognized by those of ordinary skill in the art, however, these down tubes 68 can have any desired configuration.

Figure 6:
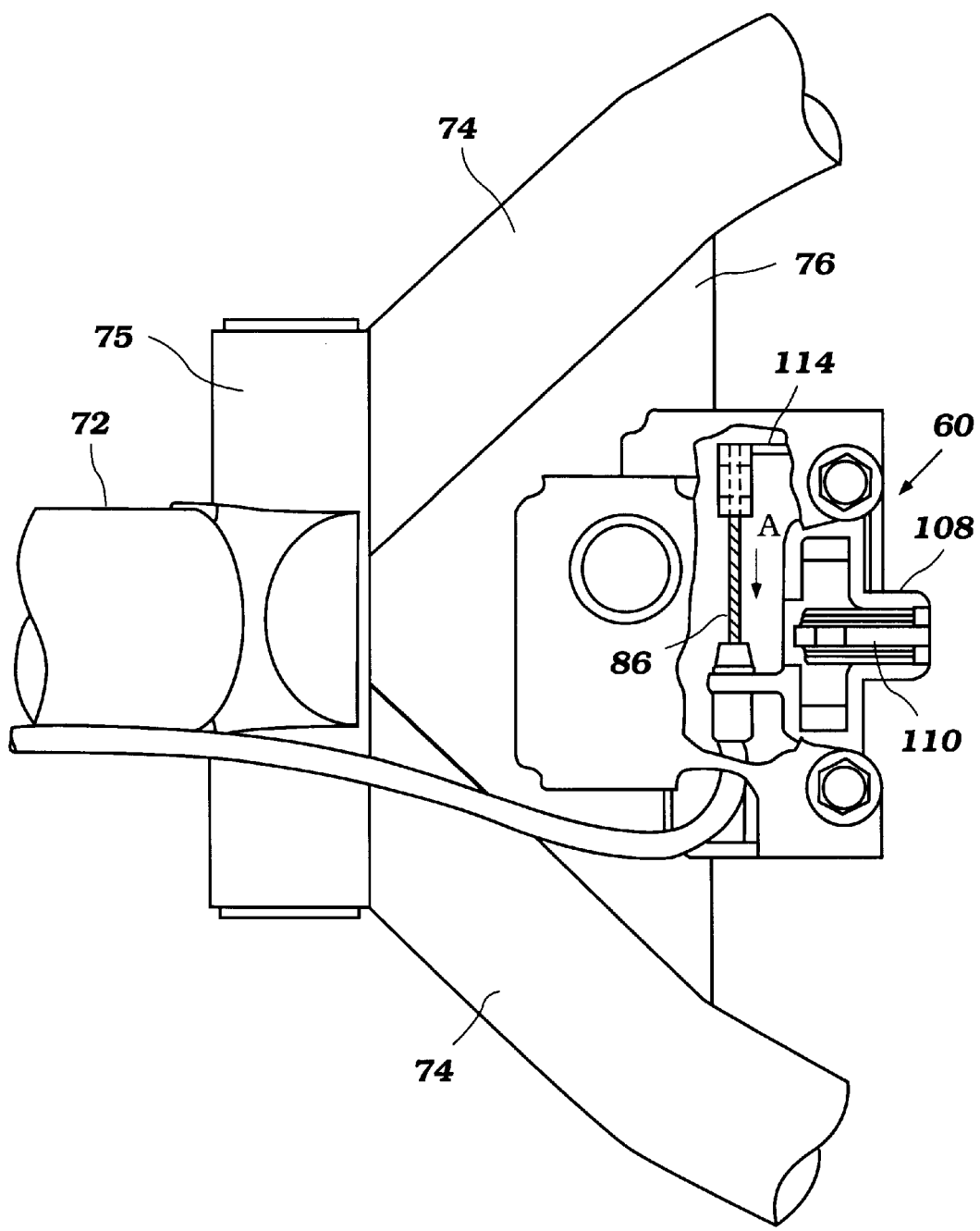
FIG. 6 is an enlarged partially sectioned top plan view of a mounting configuration for the seat lock arrangement of FIG. 4.

A reinforcing gusset 70 is preferably welded between the head pipe 66 and the down tubes 68 at their forward ends. The gusset can also connect to a main tube 72, which terminates at a forwardmost end. With reference now to FIG. 6, the main tube 72 terminates proximate a forward end of the main seat 44 at a cross pipe 75. The cross pipe 75 is interposed between the main tube 72 and a pair of seat tubes 74 in the illustrated motorcycle. The seat tubes 74 are advantageously joined at a forward portion by a reinforcing bracket member 76. The bracket member 76 will be described in detail below and joins the tubes 74 to the main tube 72 in a manner which need not be described in further detail.

Figure 3:
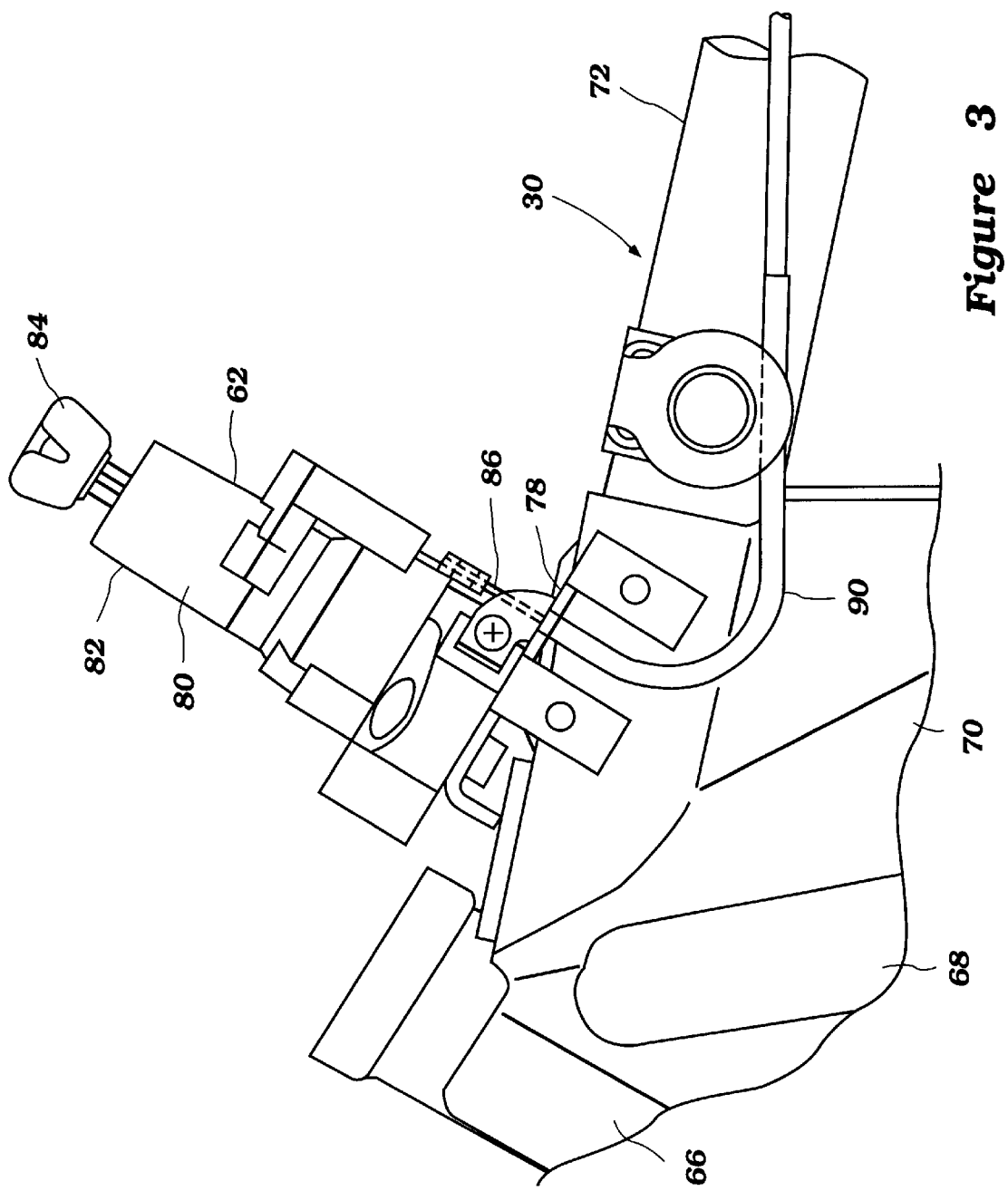
FIG. 3 is a further enlarged partial side elevation view of the motorcycle of FIG. 1 illustrating a controller for the seat lock mechanism.

With reference now to FIG. 3, a seat lock arrangement having certain features, aspects and advantages in accordance with the present invention, will be described. As discussed above, the present lock system advantageously utilizes the main switch 62 to unlock the seat lock 60, which provides access to the engine compartment or other compartments. For instance, the seat 44 may be pivoted upward and away from the frame 30. As illustrated, the main switch 62 generally comprises a cylinder 80 that is positioned within a housing 82 and that is capable of selective rotation relative to the housing 82. As is also illustrated, the cylinder 80 can be rotated by insertion of a key 84 into the cylinder 80 whereby the key 84 unlocks the cylinder from the housing 82 and allows the cylinder 80 to be rotated relative to the external housing 82. When the key 84 and the cylinder 80 are rotated relative to the housing 82, the main switch 62 is moved between an "on" position and an "off" position such that the operation of an electrical system of the motorcycle 20 can be controlled.

In addition, the key 84 and the cylinder 80 can be rotated relative to the housing 82 to actuate the seat lock 60 through manipulation of a seat lock wire 86. As illustrated, the seat lock wire 86 is preferably arranged to be pulled in a direction generally parallel to an axis of rotation of the key 84 in the proximity of the main switch 62. Preferably, the seat lock wire 86 is moved in a direction that exerts tensile forces on the wire 86 when unlocking the seat lock 60. As illustrated, pulling on proximate the main switch 62 in a direction parallel to the axis of rotation of the key 84 results in a movement of the wire along a longitudinal direction of the motorcycle 20 proximate the seat lock 60.

The main switch 62 can be attached to the frame 30 through the use of a bracket 78. Preferably, the bracket 78 is attached to the gusset 70 in a manner that inclines the switch 62 relative to a vertical direction extending away from the frame 30. This inclination advantageously reduces the effect of pooling water, dirt and the like on the movement and components of the switch 62.

With continued reference to FIG. 3, the seat lock wire 86 is advantageously passed through a small metal tube 90 that extends downward and bends rearward toward the seat lock 60. The metal tube protects the wire 86 from tampering, as well as defines a channel for movement of the wire 86 that translates the movement of the wire from a generally vertically extending movement to a generally horizontally extending movement. In this manner, the load exerted on the main switch 62 in manipulating the wire 86 can be decreased as the torque is decreased on the main switch 62.

Figure 4:
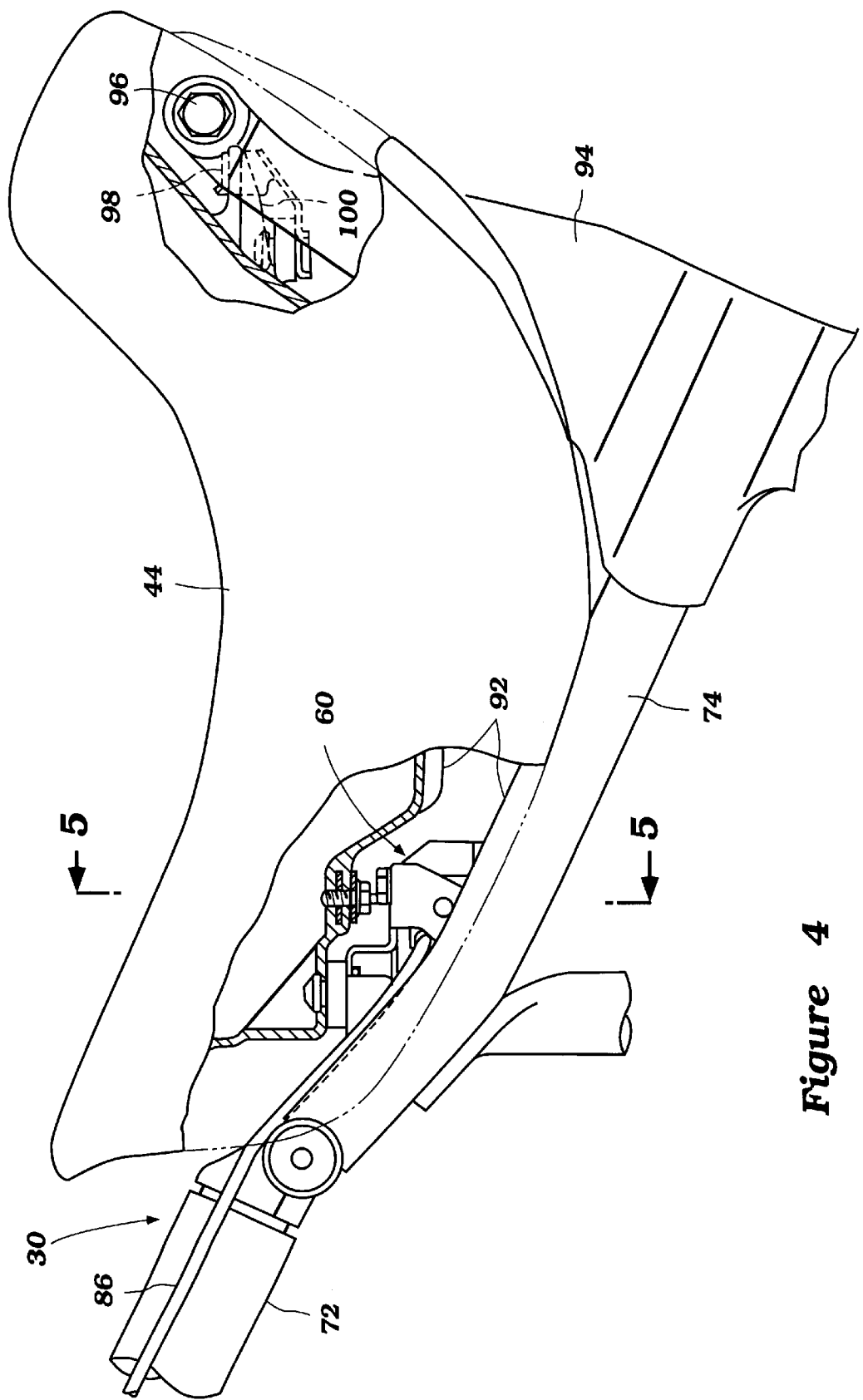
FIG. 4 is an enlarged partially sectioned side elevation view of the motorcycle of FIG. 1 illustrating a seat lock arrangement for the seat lock mechanism.

With reference now to FIG. 4, the illustrated seat 44 is attached to the frame 30 in two locations. Preferably, the seat lock 60 is positioned on a forward portion of the seat 44 to decrease the distance between the seat lock 60 and the main switch 62. Accordingly, a rear portion of the seat is preferably pivotably attached to the frame 30 in a manner which will be described. The illustrated seat 44 includes a bottom plate 92 to which the balance of the seat body and padding is attached. The bottom plate 92 can be integrally formed within the seat 44 or can be a separate component arranged to be attached thereto.

With continued reference to FIG. 4, the illustrated seat 44 is attached to the frame 30 through the use of brackets 94. The brackets 94 extend upward and rearward from the frame 30 and carry a shaft 96 at their uppermost end in the illustrated motorcycle 20. The shaft 96 pivotably secures the main seat 44 to the brackets 94. As illustrated, the coupling between the seat and the brackets 94 also includes a hook 98 and an engaging portion 100. The hook 98 and the engaging portion 100 advantageously allow the seat to be removed from the motorcycle 20 after having been pivoted up away from the frame 30. In this manner, the seat 44 is removably and pivotably attached to the frame 30. Of course, those of ordinary skill in the art will readily recognize that the seat 44 can be permanently pivotably attached to the frame 30 without pivoting, can be removably attached to the frame 30, or can be arranged to pivot away from the frame 30 in any number of other arrangements.

Figure 5:
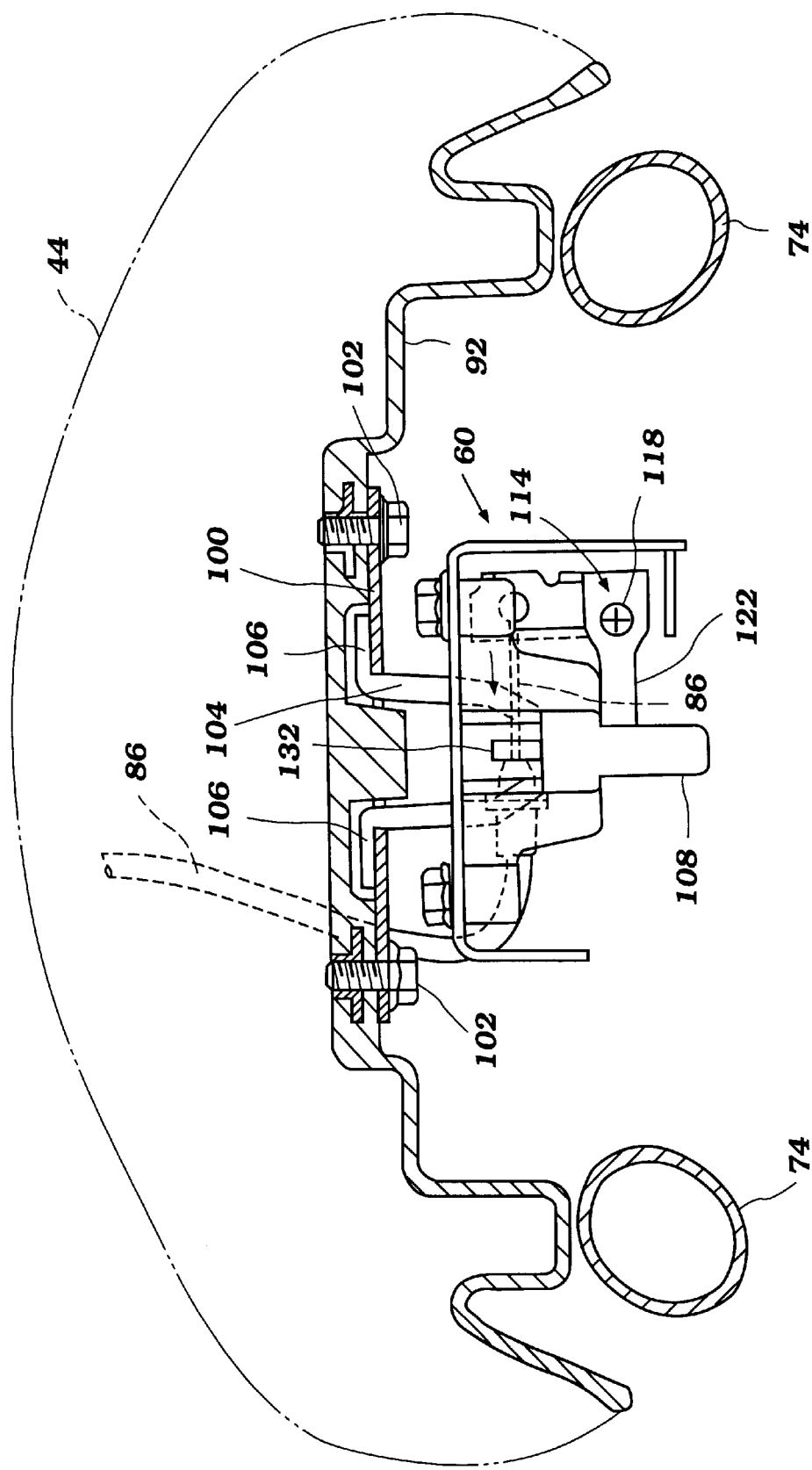
FIG. 5 is a sectioned view of the seat lock arrangement taken along the line 5—5 in FIG. 4.

According to the illustrated embodiment, the seat 44 pivots about its rear portion such that the seat 44 can be raised away from the frame 30 to gain access to a maintenance opening positioned beneath the illustrated seat 44. The seat 44 is locked into position by a seat locking mechanism. With reference now to FIG. 5, the seat locking mechanism will be described in detail. The seat lock 60 is attached to the bottom surface or bottom plate 92 of the seat 44. In the illustrated embodiment, a mounting plate 100 is secured to a lower surface of the bottom plate 92 through the use of threaded fasteners 102. As will be recognized by those of ordinary skill in the art, the fasteners 102 can also be replaced by any suitable method of attaching the mounting plate 100 to the seat 44.

With continued reference to FIG. 5, a hook 104 is attached to the seat 44 and forms a portion of the seat lock 60. The hook 104 preferably includes a pair of outwardly extending fingers 106 that are trapped within pockets formed in the lower surface of the seat 44, or bottom plate 92, and that are held within the pockets by the mounting plate 100. In the illustrated embodiment, the hook 104 is formed in a generally U-shaped configuration. As will be recognized by those of ordinary skill in the art, however, many other suitable configurations for the hook 104 can also be used, such as an L an I, and the like.

Figure 7:
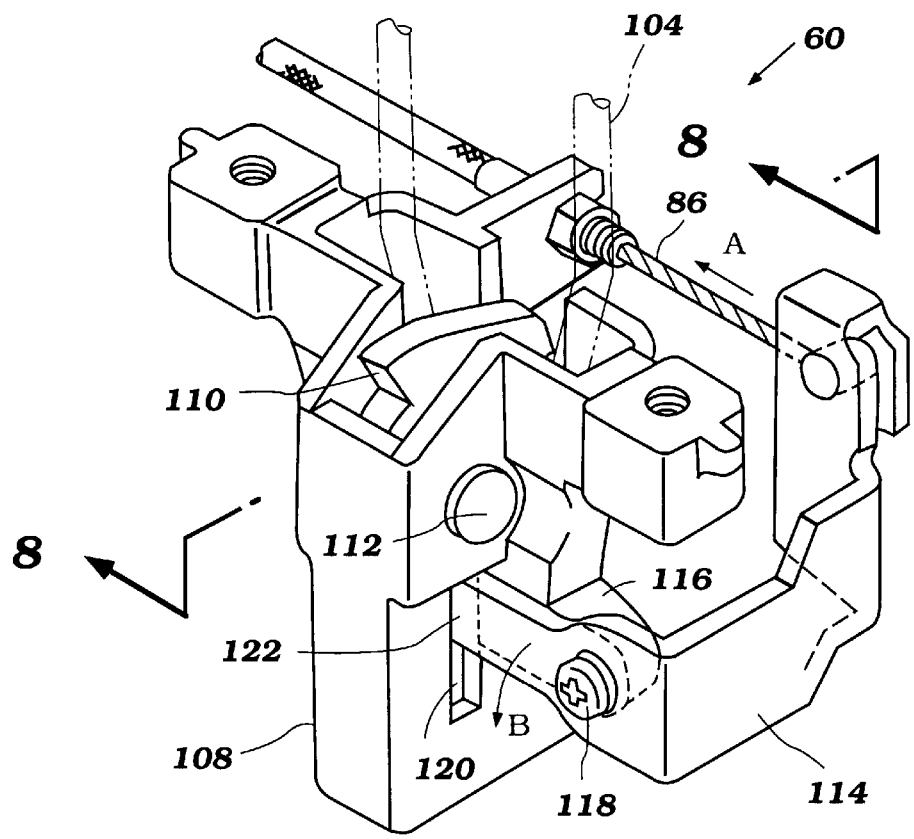
FIG. 7 is a perspective illustration of the seat lock arrangement of FIG. 4.
Figure 8:
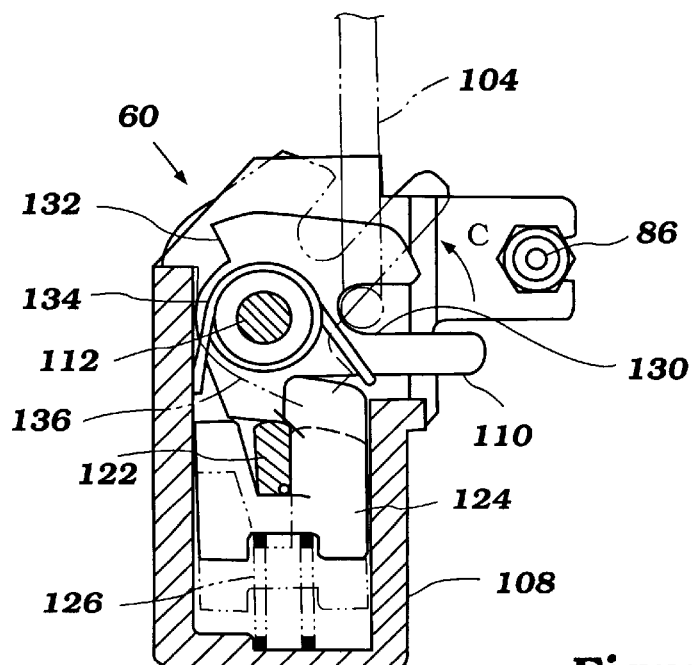
FIG. 8 is a sectioned view of the seat lock arrangement of FIG. 4 taken along the line 8—8 in FIG. 7.

With reference now to FIGS. 7 and 8, the hook 104 preferably depends downward into a lock case 108. A catch 110 is pivotably attached to the case 108 and is arranged to engage with the hook 104 to lock the hook 104 into position within the case 108. The catch 110 pivots about an axis defined by a pivot shaft 112 that extends through a wall of the illustrated case 108. As illustrated, the shaft 112 preferably extends in a direction parallel to a plane defined between the two legs of the illustrated hook 104.

A lever 114 is also pivotably attached to the case 108. With reference to FIG. 7, the illustrated lever 114 is attached to the case 108 at a boss 116 using a threaded fastener 118. The lever 114 preferably pivots in a direction generally normal to the pivot direction of the catch 110. An end of the illustrated lever 114 extends through an opening 120 into the case 108. This end of the lever 114, which is indicated generally by the reference numeral 122 in FIG. 8, engages with a slider 124. The slider translates in a generally up and down direction within the case 108, as illustrated in FIG. 8. A biasing member such as a spring 126 advantageously urges the slider 124 into an upward orientation, i.e., away from a lower surface of the case 108, such that the slider returns upward when the downward force exerted by the lever 114 is removed.

The illustrated catch 110 includes a plurality of active surfaces. For instance, a slot 130 receives the hook 104 and secures the hook in a locked position when the seat lock 60 is locked. Additionally, the catch 110 includes a bottoming surface 132 which contacts a wall of the case 108 to limit the rotational movement or pivotal movement of the catch 110 about the shaft 112. A return biasing member 134 is positioned to urge the catch 110 into the locked position when the slider 124 is removed from a second stopping surface 136 of the catch 110.

Thus, in operation, as the key 84 is turned within the main switch 62, the seat lock wire 86, which is preferably of the Bowden wire type, is pulled axially through the metal tube 90 and in a direction towards the forward portion of the motorcycle 20 at the seat lock 60, as illustrated in FIG. 7 by the arrow A. As the wire 86 translates in the direction A, the lever 114 pivots about the axis defined by the threaded fastener 118 resulting in movement of the lever end 122 in the direction indicated by the arrow B. As the end of the lever 122 is moved downward in the direction B, the lever end 122 presses the slider 124 against the biasing force of the spring 126 downward. The slider 124 then no longer interferes with the rotational movement of the catch 110 about the axis defined by the shaft 112. Accordingly, the seat can be raised and, as the seat 44 is raised about the pivot axis 96, the hook 104 rotates the catch 110 about the axis defined by the shaft 112. Thus, the catch 110 rotates in the direction indicated by the arrow C in FIG. 8. The catch 110 then stops rotating when the bottoming surface contacts the lock case. With the seat raised and the catch 110 in the position shown by phantom line in FIG. 8, the lever end 122, and therefore the lever 114, can be released. A surface of the catch 110 holds the slider 124 in a lower location such that the catch 110 is positioned in a hook-receiving position until the hook 104 engages with the slot 130 in the catch 110 to rotate the catch 110 into the locked position, which is illustrated in solid line. Once the catch 110 has been rotated back into the locked position, the slider 124 is returned to its interfering position by the spring 126. While the present invention is described in terms of the above seat lock 60, it is envisioned that any number of seat locking arrangements can also be used depending, in part, upon the desired application.

With reference again to FIG. 2, a wire harness 150 is illustrated therein which runs from various electrical components to a battery (not shown) which can be positioned in a rearward location on the motorcycle 20. The lock wire 86 preferably is routed to the seat lock 60 in a shielded location generally above and separate from the wire harness 150. Additionally, the seat lock wire 86 is preferably positioned external to the pipes making up the frame 30. The positioning of the seat lock wire 86 advantageously protects the wire 86 from tampering as well as facilitates easy manufacturing and assembly of the motorcycle 20.

Figure 9:
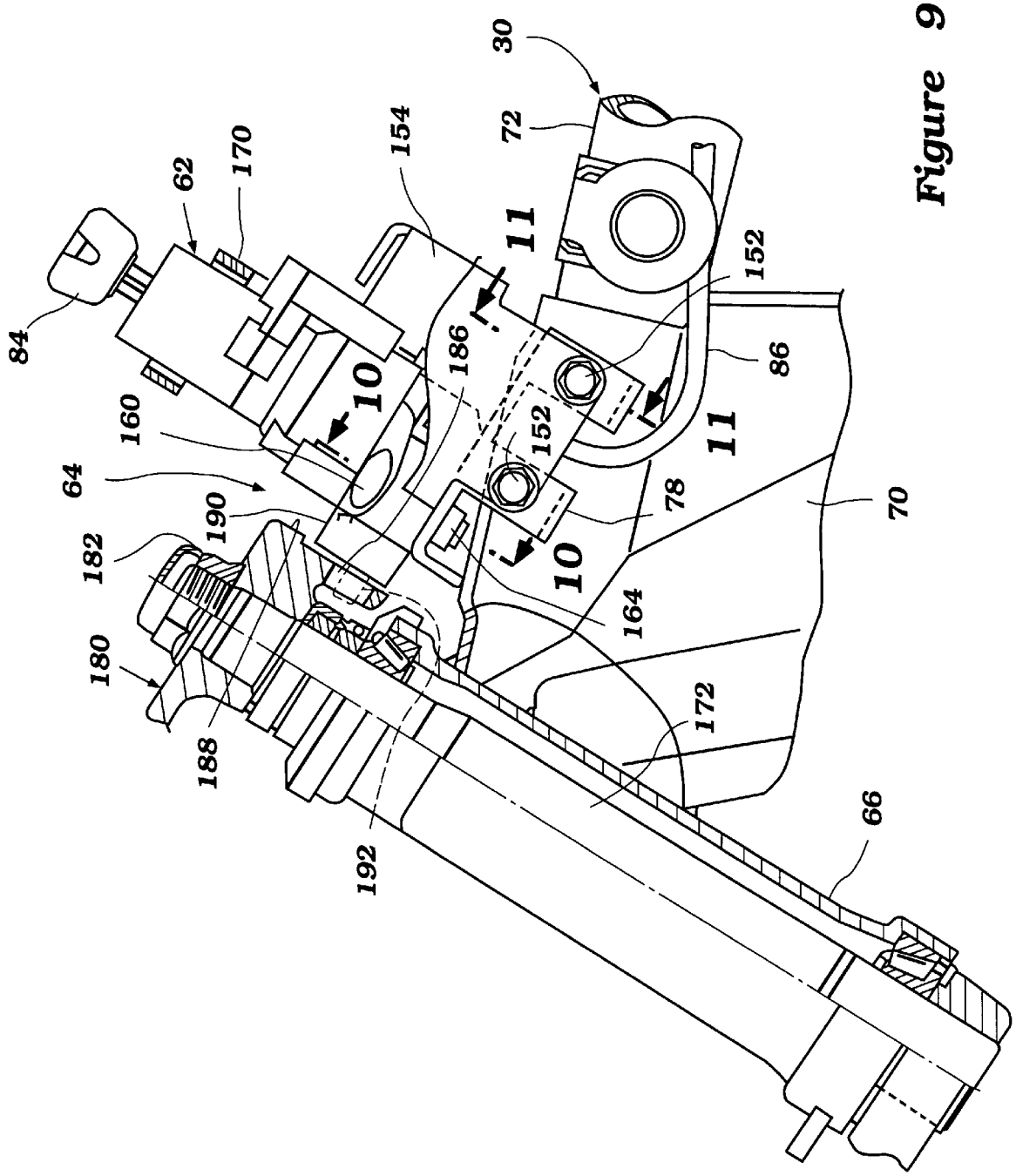
FIG. 9 is a partially sectioned side elevation view of a steering lock arrangement of the motorcycle of FIG. 1.
Figure 10:
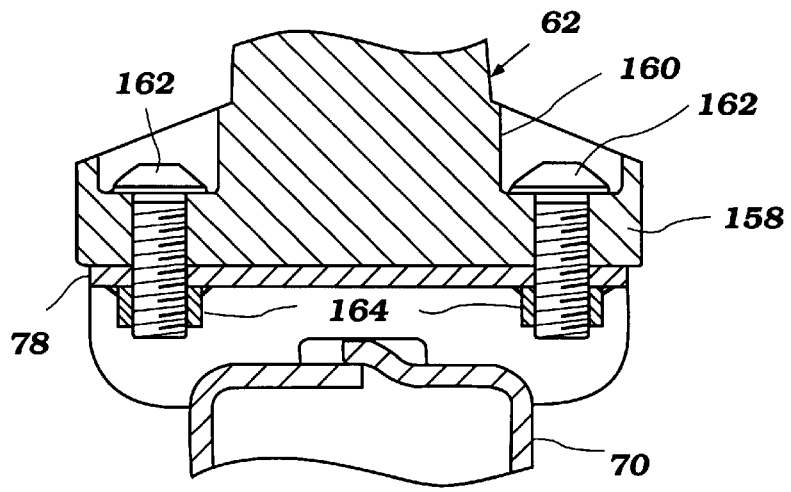
FIG. 10 is a sectioned view of the steering lock arrangement of FIG. 9 taken along the line 10—10 in FIG. 9.
Figure 11:
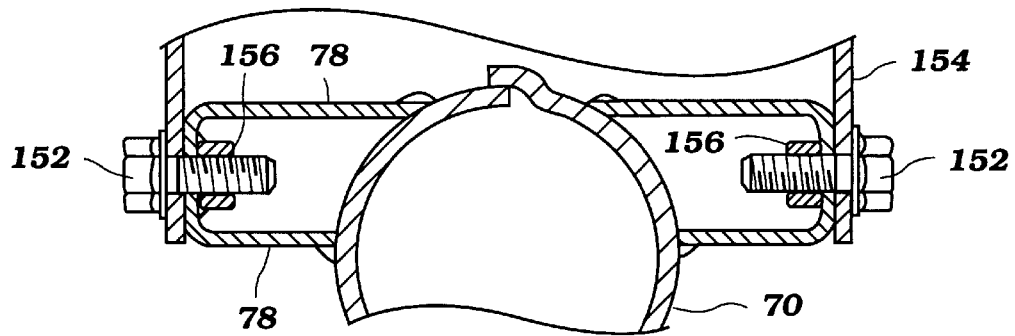
FIG. 11 is a sectioned view of the steering lock arrangement of FIG. 9 taken along the line 11—11 in FIG. 9.

With reference now to FIG. 9, the main switch 62 will be described in greater detail including the steering lock arrangement 64, which is desirably integrally formed with the main switch 62 and which is arranged and configured in accordance with certain features, aspects and advantages of the present invention. As described above, the main switch 62 is secured to the frame 30 through the use of the bracket 78. With reference to FIG. 9, the bracket 78 is desirably secured to the frame 30 through the use of threaded fasteners 152. The bracket 78 can also be welded to a portion of the gusset 70 or otherwise attached to the gusset 70 or frame 30 to allow the bracket to fix the main switch 62 to the motorcycle 20. The bracket 78 preferably extends outward away from the gusset 70 to provide clearance to either side of the gusset 70 as illustrated in FIG. 11. The bolts 152 secure a switch cover 154 in position and are held in place using nuts 156 in the illustrated motorcycle 20. The nuts 156 are preferably weld nuts that are secured to the inner surface of the bracket 78 through welding, brazing, or the like. The main switch 62 also comprises a base portion 158 as illustrated in FIG. 10. The base portion 158 preferably includes a plurality of countersunk holes 160, which receive threaded fasteners 162 to secure the main switch 62 to the bracket 78. With reference to FIG. 10, the bracket 78 preferably also features a set of weld nuts 164 which are used to secure the base portion 158 of the switch 62 in position.

The switch cover 154 preferably encases a substantial portion of the main switch 62 and protects the main switch from environmental damage. Additionally, a locking collar 170 is positioned along an upper portion of the cylinder and used to secure the main switch 62 in position on the motorcycle 20 as well as to cover an opening in a dash panel, or meter cover, as will be described below.

Figure 12:
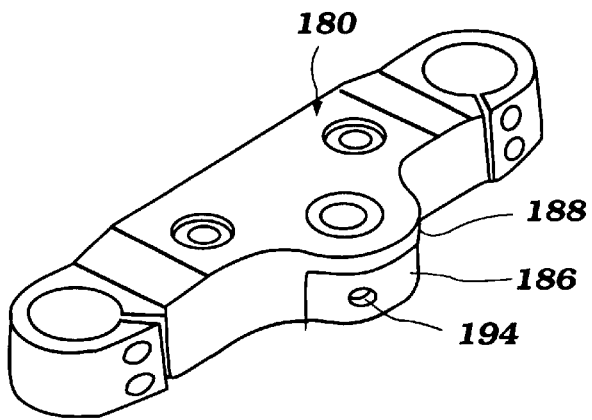
FIG. 12 is a perspective view of an exemplifying crown used in the steering lock arrangement of FIG. 9.

As described above, the head pipe 66 of the motorcycle 20 journals a steering shaft 172 for rotation such that the front wheel 22 can be steered through the use of the handle bars 34. With continued reference to FIG. 9, an upper end of the steering shaft 172 carries a handle crown 180. The handle crown 180, which is also shown in FIG. 12, preferably attaches to an end of the steering shaft 172 through the use of a threaded fastener and locking nut 182. Advantageously, a portion of the handle crown 180 is recessed to form a protective chamber which is positioned below and defined at least in part by an upper lip 188. A portion of the base portion 158 advantageously extends into the cavity 186. This portion 190 forms an overlap with the lip 188. By forming the overlap with the lip 188, the base portion 158 protects a locking pin 192 from tampering such as by chisels or saw blades or the like.

The locking pin 192 is advantageously designed to engage with a hole 194 (shown in FIG. 12) that extends and retracts through the use of the main switch 62. As will be recognized, any suitable manner of making the pin 192 extend or retract into and out of engagement with the hole 194 can be used. Additionally, the pin 19 may also be a rotatable disk, a cam, or other suitable member. In the present motorcycle 20, the locking pin 192 is carried at the end of a camming surface and is spring biased into either an extended or retracted position with the camming surface acting against the spring bias to either engage or disengage the pin from the hole 194.

Figure 13:
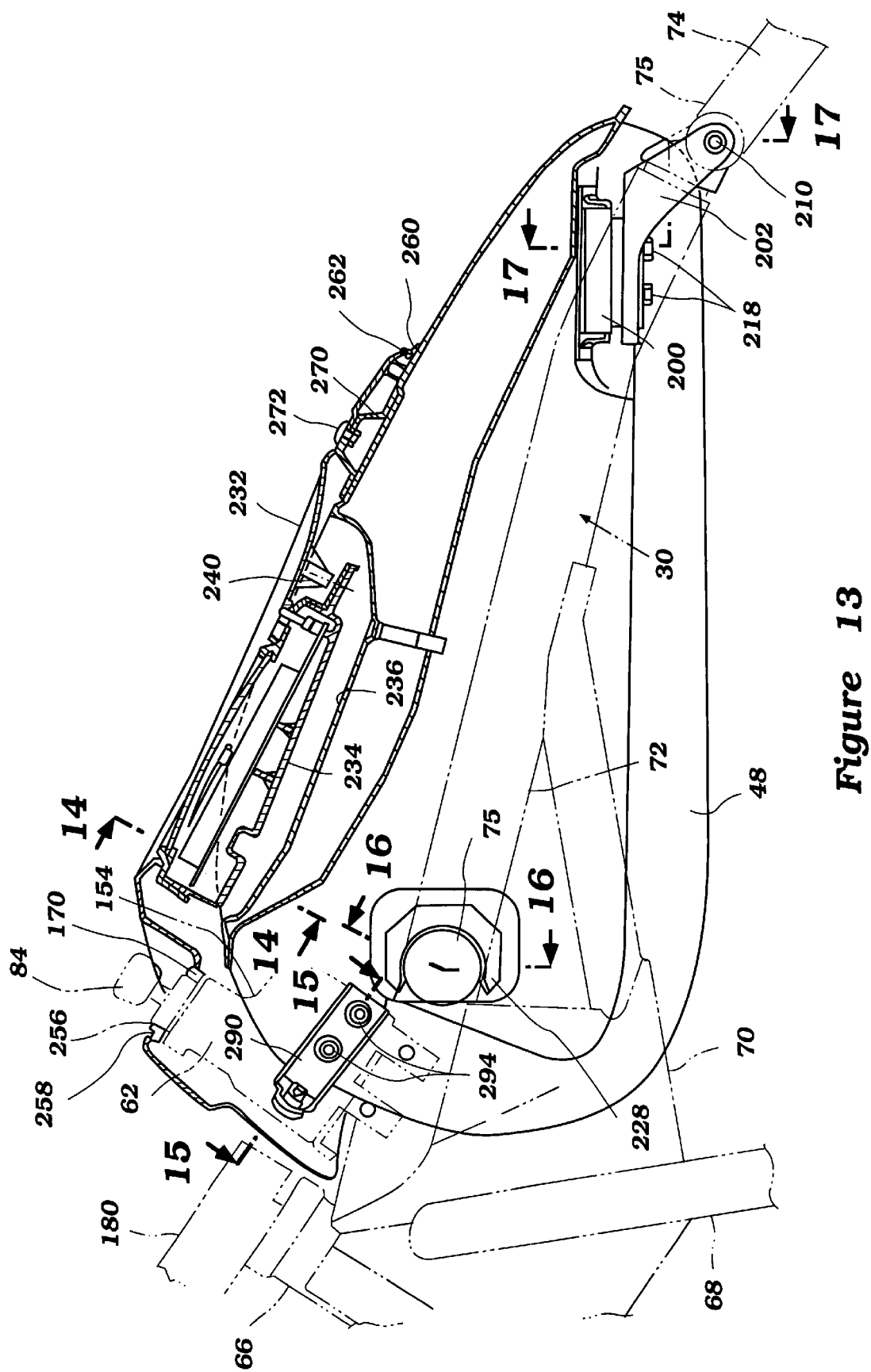
FIG. 13 is a partially sectioned side elevation view of a meter cover and main switch mounting arrangement of the motorcycle of FIG. 1.

With reference now to FIG. 13, a mounting arrangement for the main switch and a mounting arrangement for the gauge assembly are illustrated therein. The mounting arrangements have certain features, aspects and advantages in accordance with the present invention. For instance, the gauge assembly and the main switch are combined together into a single assembly. In addition, FIG. 13 illustrates a fuel tank mounting arrangement that secures the fuel tank 48 to the frame 30.

With continued reference to FIG. 13, the fuel tank 48 is mounted to the welded-up frame assembly 30. As illustrated, the fuel tank 48 is secured at a rear portion to a pair of supporting members 200 through the use of brackets 202. Of course, the number of supporting members and brackets can be increased or decreased according to the application. With reference to FIG. 18, which is a bottom side view of the fuel tank 48, and with reference to FIG. 17, which includes a sectioned view of the supporting members 200, the supporting members 200 depend downward from a lower surface 204 of the fuel tank 48. As illustrated, the supporting members 200 preferably are welded or otherwise suitably attached to the lower surface 204. In addition, the supporting members 200 preferably include an internally threaded boss 206 or weld nut or the like for a purpose that will be discussed.

The brackets 202 preferably extend upward from a cross pipe 75. In the illustrated motorcycle 20, a tie rod 210 extends through the cross pipe 75 and secures the brackets 202 to the cross pipe 75. As illustrated, the tie rod 210 can be formed from a bolt that extends through the cross pipe 75. Of course, the tie rod 210 can be a carriage bolt, a threaded rod, a rod having threaded ends, a rod receptive of pins or other mechanical fasteners or the like. The illustrated tie rod receives an acorn nut, or box nut, which is indicated by the reference numeral 212. Of course, other mechanical fasteners can also be used, such as lock nuts, nuts, pins, caps and the like. The tie rod 210 preferably extends through a sleeve 214, but the sleeve 214 can be omitted in some applications. Advantageously, the sleeve 214 reduces movement of the tie rod 210 within the cross pipe 75.

Figure 17:
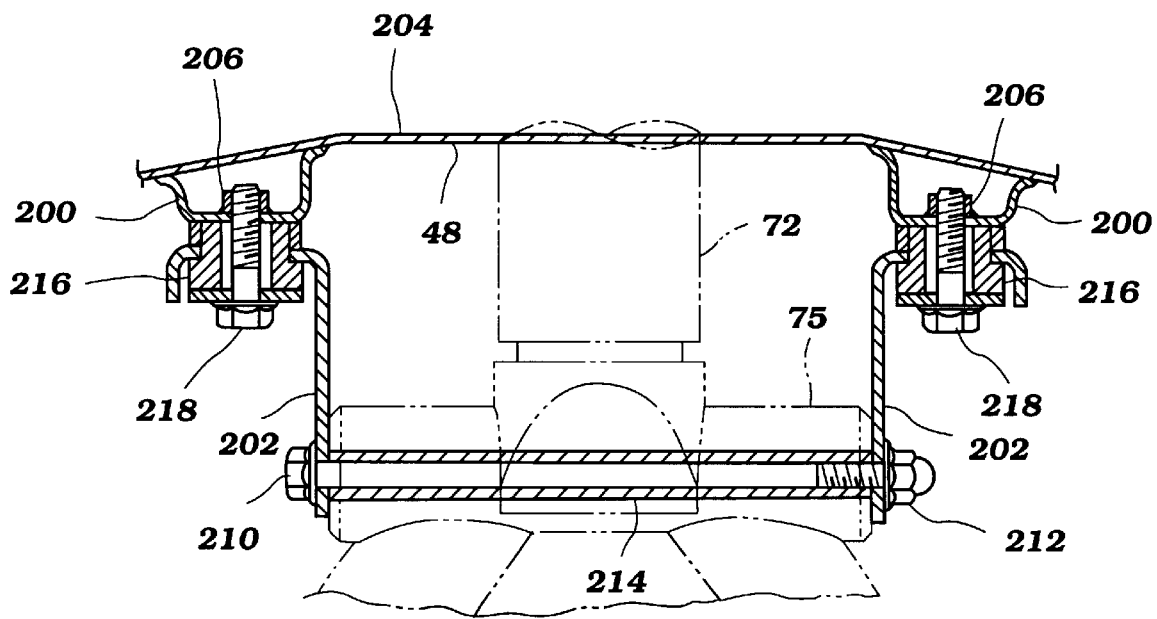
FIG. 17 is a sectioned view of the meter cover and main switch mounting arrangement of FIG. 13 taken along the line 17—17.
Figure 18:
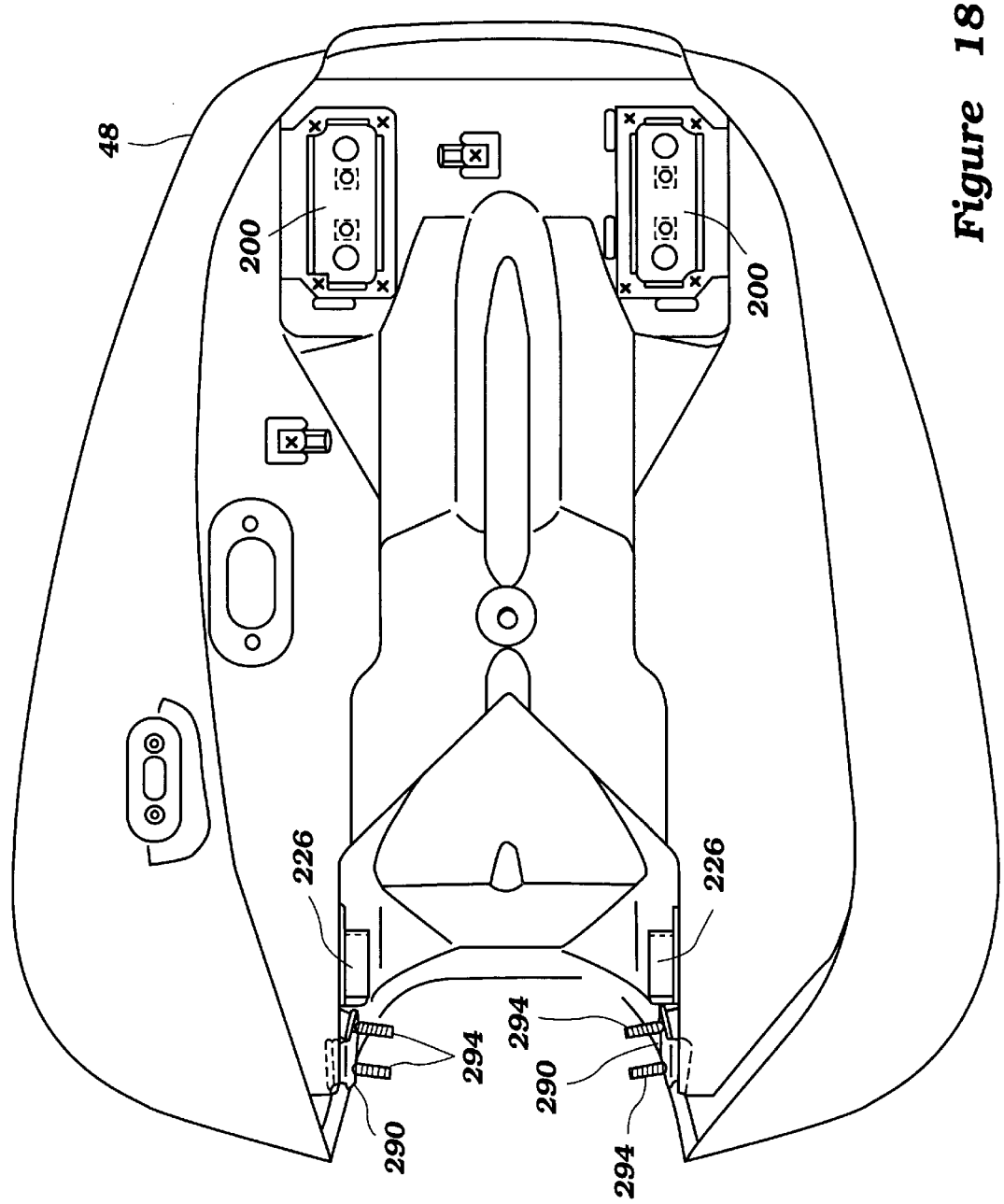
FIG. 18 is a bottom side view of a fuel tank of the motorcycle of FIG. 1.

With continued reference to FIG. 17, the supporting members 200 and the brackets are preferably separated from one another by a resilient damper 216. In the illustrated motorcycle 20, the damper 216 forms a sleeve through which a threaded fastener 218 extends to couple the brackets to the corresponding supporting members 200. Advantageously, the damper 216 is positioned between the bracket 202 and the fastener 218 as well as between the bracket 202 and the supporting member 200. Thus, the damper reduces the transmission of vibrations while also reducing the amplitude of the vibrations that are transmitted. Therefore, the fuel tank 48 is preferably substantially isolated from frame vibrations often encountered during ordinary operation of the motorcycle 20.

Figure 16:
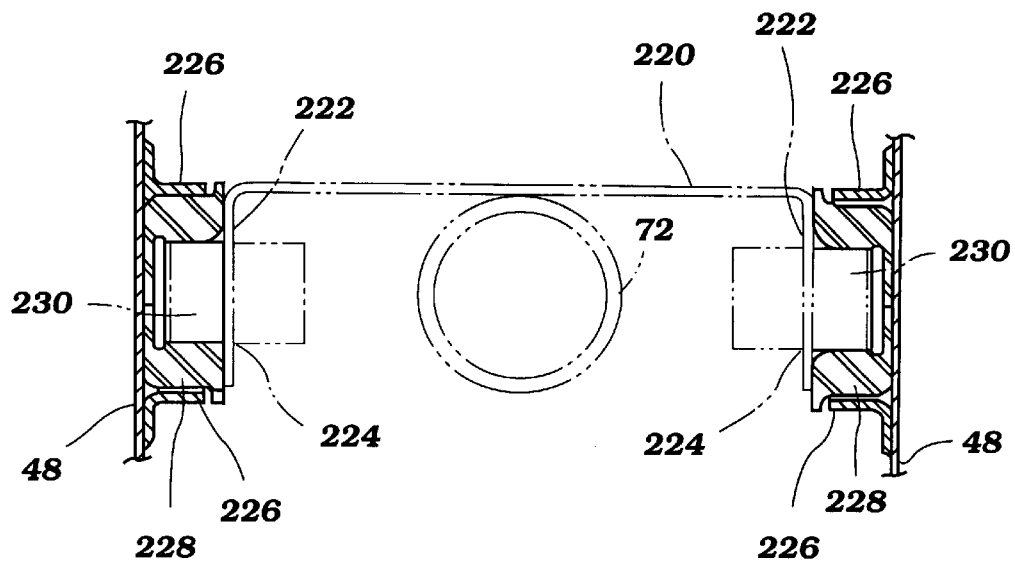
FIG. 16 is a sectioned view of the meter cover and main switch mounting arrangement of FIG. 13 taken along the line 16—16.

With reference now to FIG. 16, a forward portion of the fuel tank 48 is also secured to the frame 30 in the illustrated embodiment. As illustrated, the main tube 72 of the frame extends through a generally centralized recess formed within the fuel tank 48. A bracket 220 is preferably positioned within the recess of the fuel tank and can be attached to the main pipe 72 in some applications and can remain free from the pipe 72 in other applications.

The bracket 200 preferably includes a pair of downturned legs 222 that each feature an aperture 224. In the illustrated motorcycle 20, a pair of inner surfaces of the fuel tank 48 each carries a pair of flanges 226. The flanges 226 define a mounting position for a damper component 228. The damper component 228 preferably is formed as an end cap, but can also be formed as a sleeve or any other suitable shape and configuration. The damper component preferably is an interface between a short tubular section 230 and the bracket 220. Thus, the bracket 220, the tubular section 230, the damper component 228 and the inner surfaces of the fuel tank 48 cooperate to form a forwardly positioned hanging strap by which the fuel tank 48 may be supported at its forward end. The damper component 228 is preferably formed of a resilient material and advantageously reduces the degree and amplitude of shocks and vibrations transferred between the welded-up frame 30 and the fuel tank 48 of the illustrated motorcycle 20.

Figure 15:
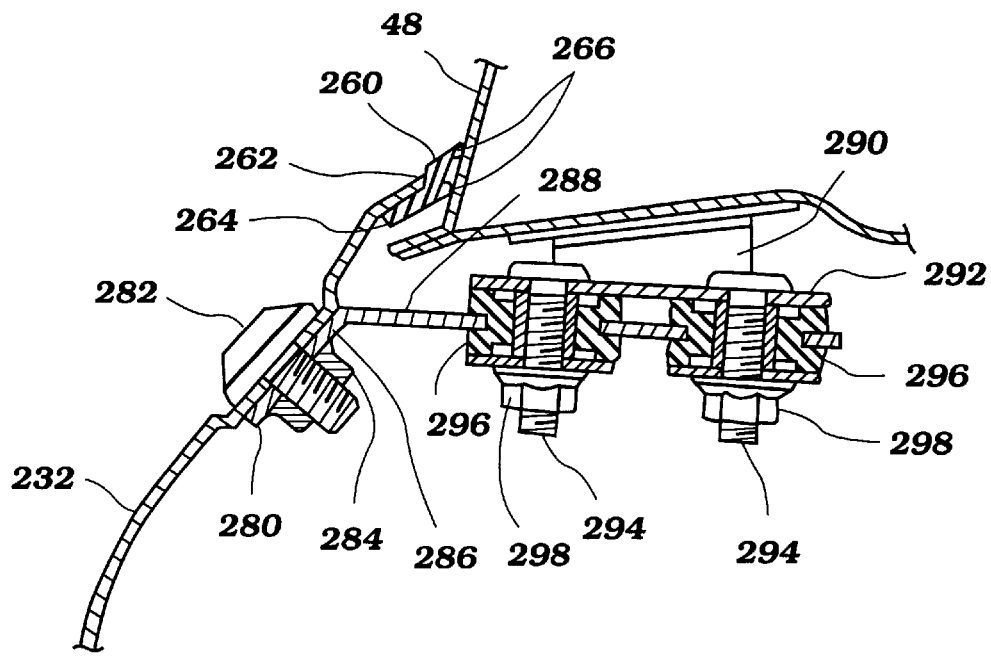
FIG. 15 is a sectioned view of the meter cover and main switch mounting arrangement of FIG. 13 taken along the line 15—15.
Figure 19:
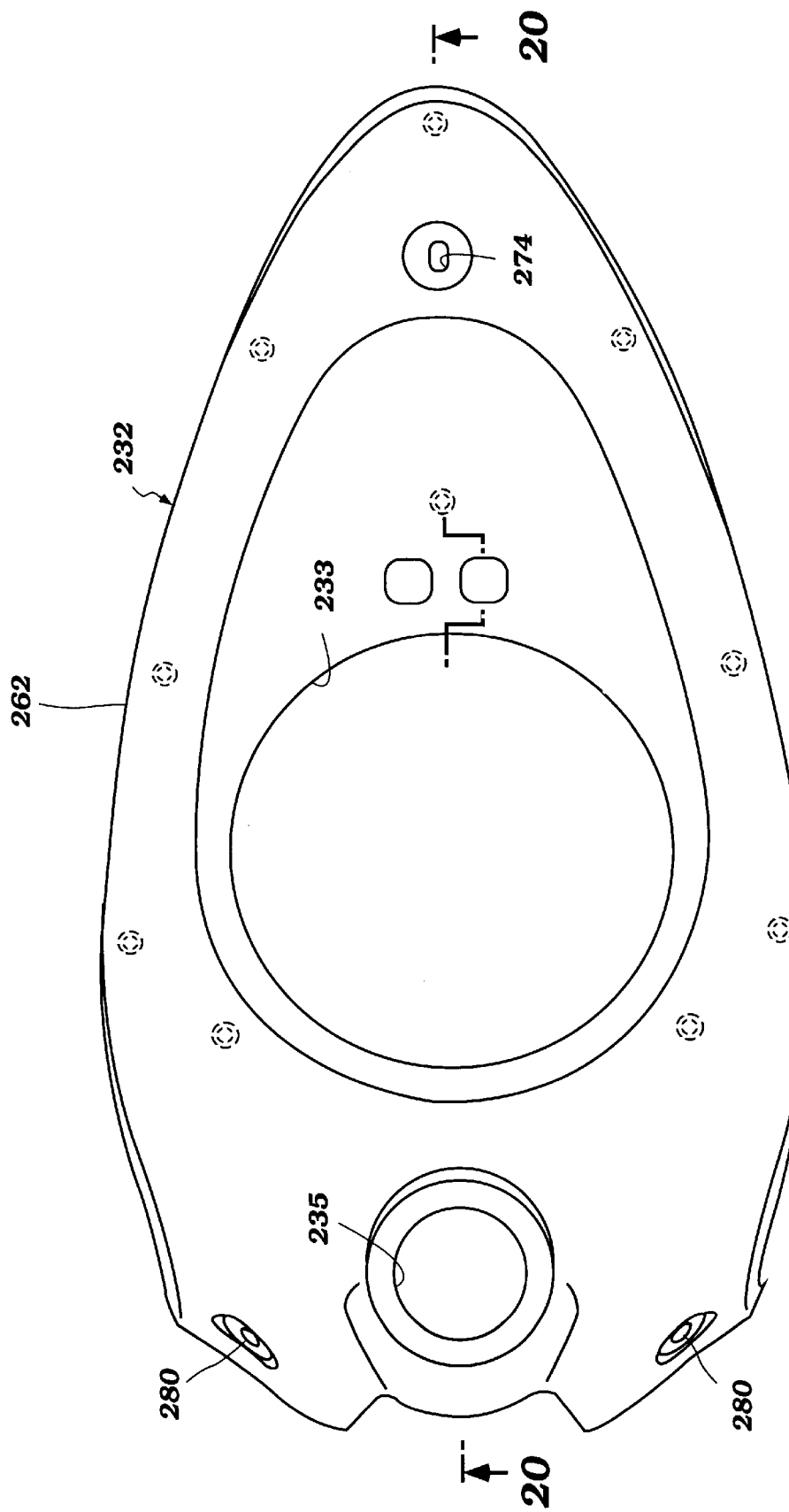
FIG. 19 is a top plan view of a meter cover of the motorcycle of FIG. 1.
Figure 20:
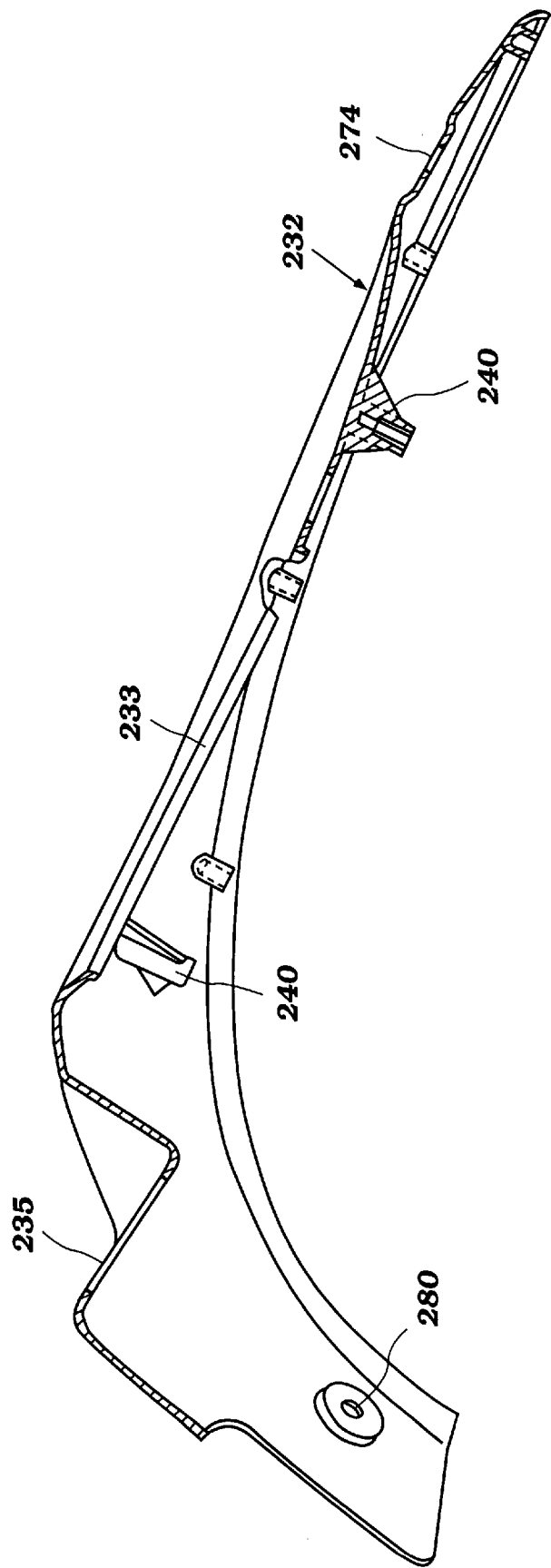
FIG. 20 is a sectioned side view of the meter cover of FIG. 19 taken along the line 20—20.

With reference now to FIGS. 13, 15 and 18, a meter cover or dash pad, indicated generally by the reference numeral 232, is attached to the illustrated fuel tank 48 and covers a substantial portion of the fuel tank 48. The presently preferred meter cover is best illustrated in FIG. 19. As illustrated in FIGS. 13 and 20, the meter cover 232 desirably includes a large opening 233 and can substantially encase at least one gauge, such as a speedometer, for example, which is indicated generally by the reference numeral 234. Of course, an instrument cluster can be substantially encased by the meter cover 232 in some applications. The gauge 234 is preferably positioned within a recess 236 formed in an upper surface of the fuel tank 48.

In addition, the meter cover 232 preferably encases the main switch 62, which is positioned in a forward location along the fuel tank, and includes a hole 235 that accommodates at least a portion of the main switch 62. The main switch 62 can be positioned over a portion of the fuel tank 48 in some applications and the main switch 62 can be positioned forward of, or to one side of, the meter or gauge 234 in other applications. Preferably, the main switch is arranged over a portion of the forward end of the fuel tank 48 and forward of the gauge 234 along a generally bisecting longitudinal plane that extends through the motorcycle 20.

Figure 14:
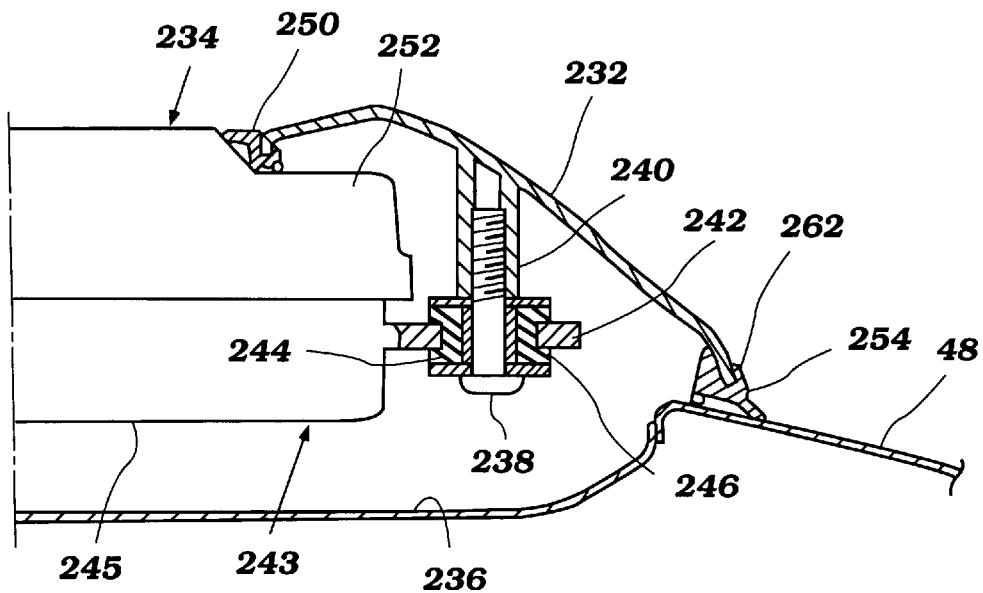
FIG. 14 is a sectioned view of the meter cover and main switch mounting arrangement of FIG. 13 taken along the line 14—14.

With reference to FIG. 14, the gauge 234 is secured to the illustrated meter cover 232 with three threaded fasteners 238 that are received by three corresponding bosses 240. Of course, more or less than three fastener and boss combinations can be used to attach the gauge 234 to the meter cover 232. In addition, other suitable connection techniques, such as snap rings and the like, may also be used.

Figure 22:
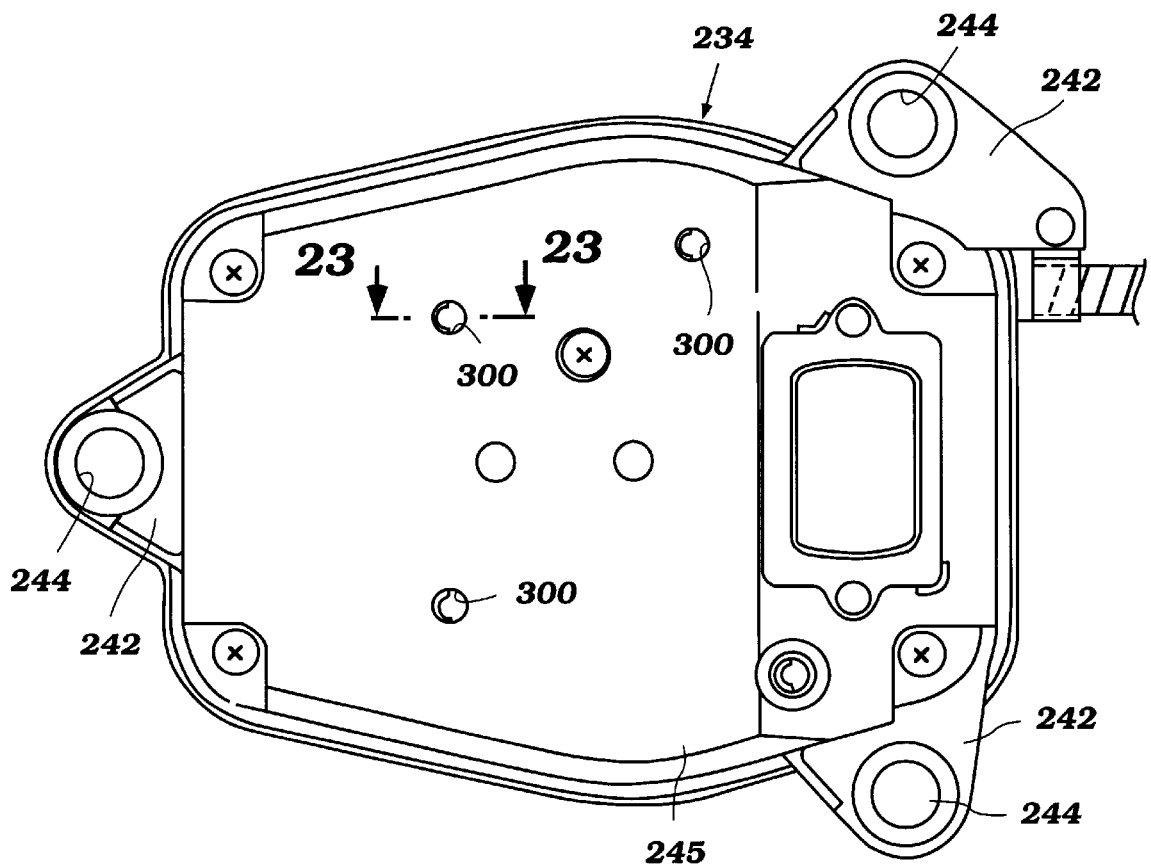
FIG. 22 is a bottom view of the meter of FIG. 21.

With reference to FIG. 22, a set of ears 242 preferably extend outward from a casing 243 of the gauge 234. As such, a portion 245 of the illustrated casing 243 projects downward below the ears 242 into the recess 236; however, the portion is advantageously spaced apart from the fuel tank 48 in the illustrated embodiment. The ears 242 include corresponding holes 244 in the illustrated meter 234. With reference again to FIG. 14, the holes 244 preferably accommodate resilient bumpers or grommets 246. Advantageously, the grommets 246 absorb at least a portion of vibration and shock energy being transmitted by the fuel tank 48 and meter cover 232. Of course, as will be explained, the meter cover 232 is preferably generally isolated from the fuel tank 48 and the frame 30 by resilient mounts such that transmitted vibratory energy is substantially dissipated. This energy dissipation advantageously shields the gauge 234.

With continued reference to FIG. 14, the illustrated meter cover 232 is desirably sealed at its connections to the fuel tank 48 and the meter 234. Specifically, as illustrated in FIG. 14, a first gasket 250 is interposed between a boss portion 252 of the illustrated meter 234 and the meter cover 232. The gasket is preferably made of a resilient material and desirably includes a pair of lips that abut the boss portion 252 in two locations. The mating of the gasket between the meter and the meter cover advantageously results in a liquid-tight joint, a non-rigid connection that will not transfer a substantial amount of vibratory energy, and a manufacturing tolerance adjustment zone.

Similar to the connection of the illustrated meter cover 232 and the meter 234, the juncture of the fuel tank 48 and the meter cover 232 is made by a second gasket 254. As with the first gasket 250, the second gasket 254 preferably meets the fuel tank 48 with a pair of lips. In addition, the gasket is preferably made of a resilient material that desirably absorbs some portion of vibratory energy while also forming a liquid-tight and adjustable joint between the fuel tank 48 and the meter cover 232.

With reference to FIG. 13, a third gasket 256 is preferably positioned around an opening 258 formed in the meter cover 232 for the main switch 62. In addition, a fourth gasket 260 is preferably positioned along an outer periphery 262 of the meter cover. The outer periphery 262 defines a general shape of the meter cover 232 and incidentally is generally positioned adjacent a portion of the fuel tank 48 that meets the meter cover 232 in the illustrated motorcycle 20. With reference to FIG. 15, the fourth gasket 260 advantageously includes a lip 264 that extends under a portion of the periphery of the meter cover 232 and a pair of lips 266 that abut the fuel tank 48 about the periphery 262 of the meter cover 232. Of course, the third and fourth gaskets 258, 260 are preferably similar in construction and material to the first and second gaskets 250, 254.

With reference now to FIGS. 13, 15 and 18, the meter cover 232 is preferably attached to the fuel tank 48 through isolating and adjusting mounting fixtures. For instance, a rear portion of the meter cover 232 is connected to a raised fixture 270 with a threaded fastener 272. Preferably, a resilient member is positioned between the fixture 270 and the meter cover 232. In addition, as illustrated in FIGS. 19 and 20, the meter cover 232 includes a slotted hole 274 through which the threaded fastener 272 extends. The slotted hole 274 allows the meter cover 232 to be adjusted as necessary during serial production.

With reference now to FIGS. 19 and 20, a forward portion of the meter cover 232 includes a plurality of holes 280. While two holes 280 have been illustrated, again the number of holes 280 is not of critical importance. Each of the holes 280 receives a fastener, such as a screw or a rivet, which is indicated in FIG. 15 by the reference numeral 282. In the illustrated motorcycle 20, the fastener 282 is a screw having a socket head. Of course, other suitable fastening arrangements will be readily apparent to those of ordinary skill in the art. Preferably, the fastener 282 screws into, or is otherwise affixed to, a weld nut, a threaded boss or the like, which is indicated by the reference numeral 284.

The weld nut 284 is attached to a leg 286 of a bracket 288. The bracket 288 is connected to the fuel tank 48 with a mounting flange 290. The illustrated mounting flange includes a leg 292 having a plurality of holes through which fasteners 294 extend. With reference to FIG. 18, the flange 290 preferably includes two threaded fasteners 294 that receive the bracket 288. The bracket 288 and the flange 290 preferably are separated by a pair of resilient grommets 296 or another suitable resilient member. The grommets 296 advantageously insulate the meter cover 232 from at least a portion of the vibratory energy transmitted through the fuel tank 48 and the frame 30 from the engine, the wheels and other moving components of the motorcycle 20. In the illustrated motorcycle, the bracket 288, the flange 290 and the grommets 296 are secured together using lock nuts 298; however, other suitable fastening techniques may also be used.

Figure 21:
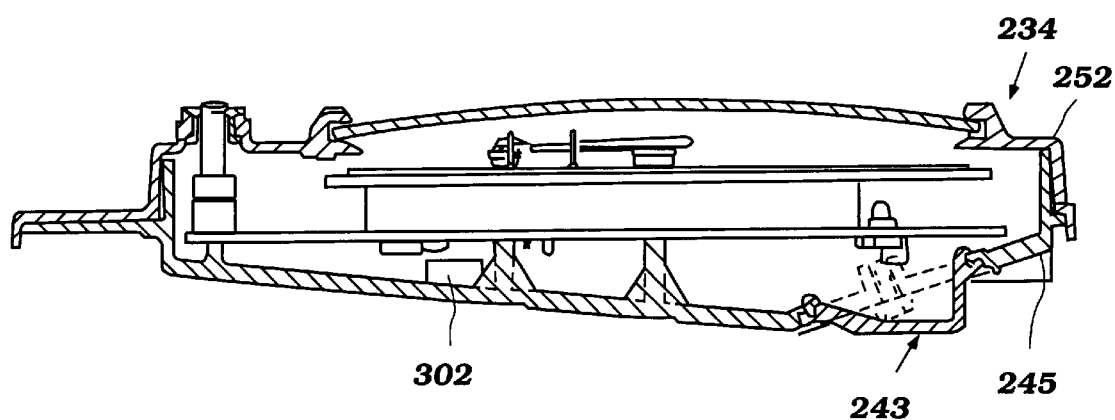
FIG. 21 is a sectioned side view of a meter of the motorcycle of FIG. 1.
Figure 23:
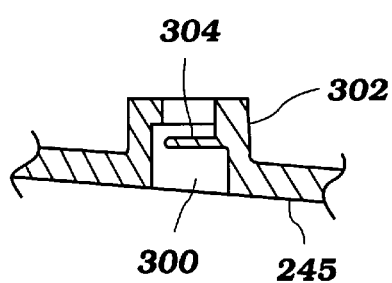
FIG. 23 is a sectioned view of a portion of the meter of FIG. 21 taken along the line 23—23 in FIG. 22.

With reference now to FIGS. 21–23, the meter 234 is preferably ventilated from a lower surface 245 of the meter 234. As illustrated in FIG. 14, the meter 234 is preferably mounted within a recess 236 formed in an upper surface of the fuel tank 48. The meter 234 is also preferably secured in a relatively water-tight chamber; however, water can infiltrate the chamber in some instances. Accordingly, the case 243 of the meter 234 is preferably provided with a plurality of water trapping ventilation apertures 300. These apertures 300 are formed within bosses 302 that extend upward from the lower portion 245 of the case 243 into the case 243. As best illustrated in FIG. 23, the bosses preferably include a projection 304 that creates a generally labyrinth passage into the meter 234. This projection 304 forms a splash guard to protect against splashing water droplets, for instance.

In use, the locking system having features and advantages in accordance with the present invention desirably feature a single actuating switch. Preferably, the switch controls the seat lock, the steering lock and the electrical system of the motorcycle. In the illustrated motorcycle, the key is inserted into the switch. The switch is then operable between a plurality of positions in which one of the positions controls the various electrical components, one of the positions controls the seat lock and one of the positions controls the steering lock. It is envisioned that any combination of positions can be used. Also, a single switch position may control more than a single component. Moreover, the key can be moved in both directions once inserted. Thus, a first rotational direction can be used to unlock the seat while a second rotational direction can be used to unlock the steering lock, supply power to the electrical components and start the motorcycle, for instance.

Although the present invention has been described in terms of a certain embodiment, other embodiments apparent to those of ordinary skill in the art also are within the scope of this invention. Thus, various changes and modifications can be made without departing from the spirit and scope of the invention. For instance, various components can be repositioned as desired. Moreover, not all of the features, aspects and advantages are necessarily required to practice the present invention. Accordingly, the scope of the present invention is intended to be defined only by the claims that follow.

What is claimed is:

1. A motorcycle comprising a frame, a front wheel being dirigibly connected to a forward portion of said frame with a steering assembly, a seat being moveably attached to said frame, a fuel tank being mounted on said frame and being positioned at least partially between said seat and said steering assembly, a main switch being positioned forward of at least a portion of said fuel tank, a gauge mounted above said fuel tank, a dash cover extending around said gauge and said main switch, said main switch controlling at least a portion of an electrical system of the motorcycle, said main switch also controlling a front wheel lock and a seat lock, said front wheel lock comprising a strike member that limits steering movement of said front wheel when engaged, and said seat lock comprising a latch mechanism that locks said seat to said frame when engaged.

2. The motorcycle of claim 1 further comprising resilient members that are positioned between said gauge and said frame such that vibratory energy transmission between said frame and said gauge may be reduced.

3. The motorcycle of claim 1, wherein said front wheel lock forms a portion of said main switch, said steering assembly including a recess into which said portion of said main switch extends.

4. The motorcycle of claim 3, wherein said striking member moves between an engaged position and a disengaged position within said recess.

5. The motorcycle of claim 4, wherein said striking member is a lock pin.

6. The motorcycle of claim 1, wherein said gauge and said main switch are positioned along a longitudinally extending substantially vertical plane that substantially bisects said motorcycle.

7. The motorcycle of claim 1, wherein said dash cover is attached to said fuel tank with a fastener that extends through a slot such that said dash cover is adjustably fitted to said fuel tank.

8. The motorcycle of claim 1, wherein said gauge is mounted above said fuel tank in said dash cover.

9. The motorcycle of claim 1, wherein said main switch is mounted to said frame.

10. The motorcycle of claim 1 further comprising an interface between said dash cover and said fuel tank and a resilient gasket being positioned along said interface.

11. The motorcycle of claim 10, wherein said gasket includes a lip that accommodates manufacturing tolerances.

12. The motorcycle of claim 1, wherein said main switch is actuated by a key and said key rotates about an axis that is inclined relative to a vertically extending axis.

* * * * *